US012701344B2

(12) United States Patent
Tamba et al.

(10) Patent No.: US 12,701,344 B2
(45) Date of Patent: Aug. 4, 2026

(54) SETTING DEVICE, SETTING METHOD, AND COMPUTER READABLE RECORDING MEDIUM

(71) Applicant: Yokogawa Electric Corporation, Tokyo (JP)

(72) Inventors: Mamoru Tamba, Tokyo (JP); Yuji Sekigami, Tokyo (JP); Kazuyuki Obara, Tokyo (JP); Shogo Wakuda, Tokyo (JP); Yasumasa Ishihara, Tokyo (JP); Akihisa Mukaiyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 19/017,036

(22) Filed: Jan. 10, 2025

(65) Prior Publication Data

US 2025/0240551 A1      Jul. 24, 2025

(30) Foreign Application Priority Data

Jan. 19, 2024      (JP) ................................. 2024-006828

(51) Int. Cl.
*H04Q 9/00*           (2006.01)
(52) U.S. Cl.
CPC ........... *H04Q 9/00* (2013.01); *H04Q 2209/30* (2013.01)
(58) Field of Classification Search
CPC .. H04Q 9/00; H04Q 2209/00; H04Q 2209/30; H04Q 2209/80; H04Q 2209/82; H04Q 2209/84; H04Q 2209/88; G08C 19/00
See application file for complete search history.

(56) References Cited

U.S. PATENT DOCUMENTS

| 5,420,578 A | 5/1995 | O'Brien et al. |
| 10,379,145 B2 * | 8/2019 | Simon ................ G01R 19/1659 |

FOREIGN PATENT DOCUMENTS

| DE | 102010041731 A1 * | 4/2012 | ......... G05B 19/0425 |
| JP | 2013092971 A | 5/2013 | |
| WO | WO-2013180591 A1 * | 12/2013 | ......... G05B 23/0235 |

OTHER PUBLICATIONS

Extended European Search Report dated Jul. 2, 2025 issued for European patent application No. 25151145.7.

* cited by examiner

*Primary Examiner* — Franklin D Balseca
(74) *Attorney, Agent, or Firm* — RANKIN, HILL & CLARK LLP

(57)           ABSTRACT

A setting device includes a processor configured to perform communication for obtaining a second current output range which represents a current output range of a transmission signal passing via a loop formed between a transmitter that converts a physical quantity into a current value and an input-output device that outputs a current value input from the transmitter to a system and which has minimum current value or maximum current value to be smaller than a first current output range, and set current output corresponding to either the first current output range or the second current output range based on whether or not the second current output range is successfully obtained.

11 Claims, 13 Drawing Sheets

VOLTAGE DROP
V3

ARRIVING
VOLTAGE
V1-V3

SUPPLY
VOLTAGE
V1

TRANSMITTER
(V2)

50

ROUTE
RESISTANCE

30

CURRENT 4 mA                                   12 mA 3.6 mA                                 11 mA

OPERABLE RANGE
FOR BOTH DEVICES

FIG.6

| | CURRENT SIGNAL USE OF 4-20 mA (STANDARD) | CURRENT SIGNAL USE OF 4-20 mA, LOWERING OF SUPPLY VOLTAGE | CURRENT SIGNAL USE OF 4-12 mA | CURRENT SIGNAL USE OF 4-12 mA, LOWERING OF SUPPLY VOLTAGE | FIXING OF CURRENT TO 4 mA, DIGITAL COMMUNICATION | FIXING OF CURRENT TO 4 mA, LOWERING OF SUPPLY VOLTAGE, DIGITAL COMMUNICATION |
|---|---|---|---|---|---|---|
| MODE NUMBER (1 TO 8) | 8 | 7 | 6 | 5 | 2, 4 | 1, 3 |
| SUPPLY VOLTAGE [V] | 24 | 19 (*1) | 24 | 19 (*1) | 24 | 19 (*1) |
| CURRENT [mA] | 4-20 | 4-20 | 4-12 | 4-12 | 4 | 4 |
| MAXIMUM CONSUMED POWER [mW] (*2) | 480@20 mA | 380@20 mA | 288@12 mA | 228@12 mA | 96 | 76 |
| POWER REDUCTION EFFECT [%] | 0 (REFERENCE) | -20 | -40 | -52 | -80 | -84 |

(*1) 19 V IS GIVEN ONLY AS EXAMPLE; AND POWER REDUCTION EFFECT CAN BE ENHANCED WHEN INPUT-OUTPUT DEVICE SETS LARGE DROP RANGE FOR SUPPLY VOLTAGE.
(*2) CONSUMED POWER [mW] IS CALCULATED AS SUPPLY VOLTAGE [V] × CURRENT [mA].

FIG.13

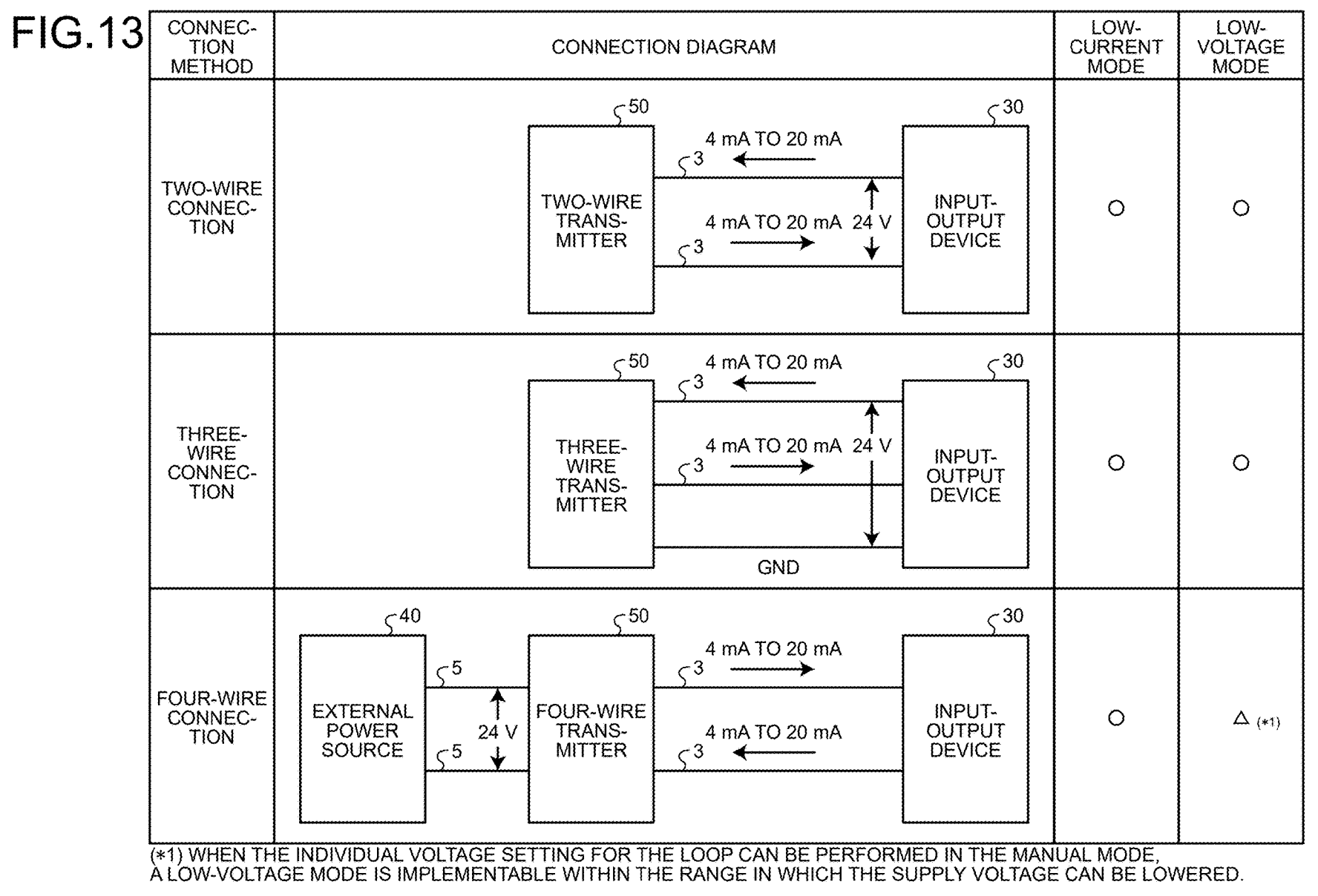

| CONNEC-TION METHOD | CONNECTION DIAGRAM | LOW-CURRENT MODE | LOW-VOLTAGE MODE |
|---|---|---|---|
| TWO-WIRE CONNEC-TION | 50 TWO-WIRE TRANS-MITTER — 3 4 mA TO 20 mA → / 3 4 mA TO 20 mA ← 24 V ↔ — 30 INPUT-OUTPUT DEVICE | ○ | ○ |
| THREE-WIRE CONNEC-TION | 50 THREE-WIRE TRANS-MITTER — 3 4 mA TO 20 mA → / 3 4 mA TO 20 mA ← 24 V ↔ GND — 30 INPUT-OUTPUT DEVICE | ○ | ○ |
| FOUR-WIRE CONNEC-TION | 40 EXTERNAL POWER SOURCE — 5 / 5 24 V ↔ — 50 FOUR-WIRE TRANS-MITTER — 3 4 mA TO 20 mA ← / 3 4 mA TO 20 mA → — 30 INPUT-OUTPUT DEVICE | ○ | △ (*1) |

(*1) WHEN THE INDIVIDUAL VOLTAGE SETTING FOR THE LOOP CAN BE PERFORMED IN THE MANUAL MODE, A LOW-VOLTAGE MODE IS IMPLEMENTABLE WITHIN THE RANGE IN WHICH THE SUPPLY VOLTAGE CAN BE LOWERED.

SETTING DEVICE, SETTING METHOD, AND COMPUTER READABLE RECORDING MEDIUM

CROSS-REFERENCE TO RELATED APPLICATION

The present application claims priority to and incorporates by reference the entire contents of Japanese Patent Application No. 2024-006828 filed in Japan on Jan. 19, 2024.

FIELD

The present invention relates to a setting device, a setting method, and a computer program product.

BACKGROUND

In a manufacturing plant, a two-wire transmitter is used for measuring a physical quantity such as the differential pressure, the temperature, or the flow rate. A two-wire transmitter converts the measured value such as the flow rate or the differential pressure into a current value within the current output range of 4 mA to 20 mA of instrumentation standardized signals; and transmits the current value to an input-output device, which represents the source current of the power supply, via a loop formed with two wires representing the power source line and the signal line shared in the same cable. The input-output device supplies the direct-current voltage of 24 V to the two-wire transmitter; and converts a current value, which is transmitted from the two-wire transmitter and which is between 4 mA to 20 mA, into a signal as per the requirement of the system.

Patent document 1: Japanese Patent Application Laid-open 2013-92971

However, since the range from 4 mA to 20 mA represents the world standard for the transmission signals for instrumentation as established by the IEC (International Electrotechnical Commission), it has remained untouched as an inviolable range. Hence, it has been difficult to achieve low-power operation in the abovementioned loop.

It is an objective of the present invention to achieve reduction in the electrical power of the loop.

SUMMARY

According to one aspect of embodiments, a setting device includes a processor configured to perform communication for obtaining a second current output range which represents a current output range of a transmission signal passing via a loop formed between a transmitter that converts a physical quantity into a current value and an input-output device that outputs a current value input from the transmitter to a system and which has minimum current value or maximum current value to be smaller than a first current output range, and set current output corresponding to either the first current output range or the second current output range based on whether or not the second current output range is successfully obtained.

According to one aspect of embodiments, a setting method executed by a processor includes performing communication with a transmitter for obtaining a second current output range which represents a current output range of a transmission signal passing via a loop formed between a transmitter that converts a physical quantity into a current value and an input-output device that outputs a current value input from the transmitter to a system and which has minimum current value or maximum current value to be smaller than a first current output range, and setting current output corresponding to either the first current output range or the second current output range based on whether or not the second current output range is successfully obtained.

According to one aspect of embodiments, a non-transitory computer readable recording medium stores therein a setting program that causes a computer to execute a process including performing communication with a transmitter for obtaining a second current output range which represents a current output range of a transmission signal passing via a loop formed between a transmitter that converts a physical quantity into a current value and an input-output device that outputs a current value input from the transmitter to a system and which has minimum current value or maximum current value to be smaller than a first current output range, and setting current output corresponding to either the first current output range or the second current output range based on whether or not the second current output range is successfully obtained.

BRIEF DESCRIPTION OF DRAWINGS

FIG. 6 is a diagram illustrating the power reduction effect achieved in each mode;

FIG. 13 is a diagram illustrating an example of the application range of a low-current mode and a low-voltage mode.

DESCRIPTION OF EMBODIMENTS

An illustrative embodiment (hereinafter, referred to as "embodiment") of a setting device, a setting method, and a computer program product according to the application concerned is described below with reference to the accompanying drawings. In the embodiment, the explanation is given only about an example; and the configuration, the structure, the functions, the numerical values used for identification, and the usage scenarios are not limited by the embodiment described below. Moreover, embodiments can be adaptively combined without causing any contradiction in the operation details.

First Embodiment

Overall Configuration

Figure 1:
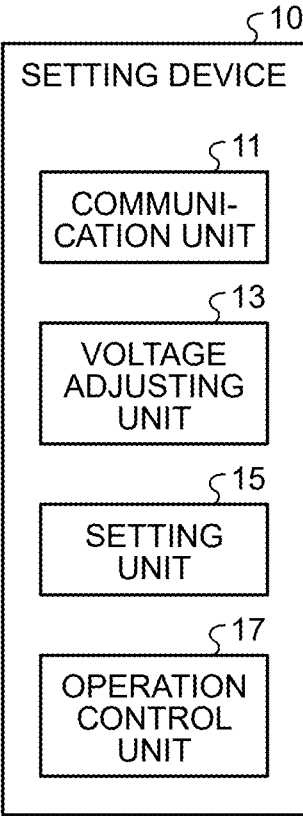
FIG. 1 is a block diagram illustrating an exemplary functional configuration of a setting device.

FIG. 1 is a block diagram illustrating an exemplary functional configuration of a setting device. A setting device 10 illustrated in FIG. 1 provides a setting function for setting the current output for the transmission signals for instrumentation that are transmitted and received via a loop formed between a transmitter, which converts a physical quantity measured in a manufacturing plant into a current value, and an input-output device that outputs, to a system, the current value input from the transmitter.

As an aspect, the setting device 10 can be implemented as a transmitter or an input-output device. For example, the transmitter can be a field device installed in a manufacturing plant. For example, the transmitter can be an instrumentation device for measuring a physical quantity such as the differential pressure, the temperature, or the flow rate. The input-output device can be a DCS (Distributed Control Systems) or a PLC (Programmable Logic Controller). Alternatively, the setting device 10 can be implemented as a control device that is communicably connected to a transmitter or an input-output device.

4 mA to 20 mA

Figure 2:
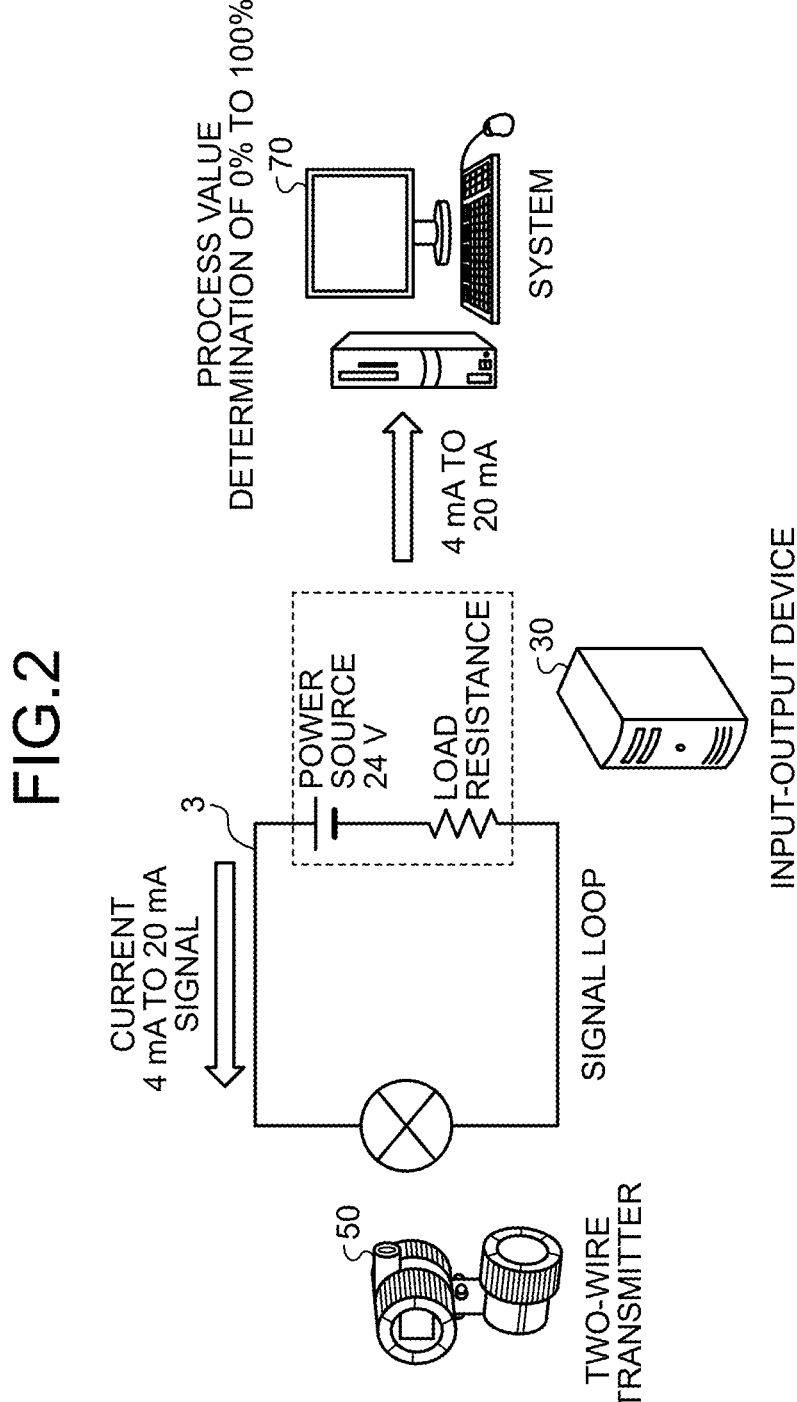
FIG. 2 is a schematic diagram illustrating an example of the operations of an entire loop.

Given below is the explanation about an example of the operations of an entire loop in which the signals in the range from 4 mA to 20 mA are used. FIG. 2 is a schematic diagram illustrating an example of the operations of the entire loop. As illustrated in FIG. 2, in between an input-output device 30 and a two-wire transmitter 50, a loop 3 is formed in which two wires representing the power source line and the signal line are shared in the same cable.

In the first embodiment, a two-wire transmitter is explained as an example of a transmitter. However, the connection method for a transmitter is not limited to the two-wire connection. Thus, although explained later in detail with reference to FIG. 13, herein it is mentioned in advance that the three-wire connection or the four-wire connection can also be used as the connection method for a transmitter.

As an aspect, the loop 3 functions as the power supply line. For example, in the loop 3, when a direct-current voltage of 24 V is supplied from the input-output device 30 to the two-wire transmitter 50, the two-wire transmitter 50 performs operations at the direct-current voltage of 24 V.

As another aspect, the loop 3 also functions as the line for signal output. For example, the two-wire transmitter 50 converts the measured value of a physical quantity, such as the flow rate or the differential pressure, into a current value in the current output range from 4 mA to 20 mA for instrumentation standardized signals; and transmits the current value to the input-output device 30 via the loop 3.

The current value transmitted to the input-output device 30 is then converted into a signal as per the requirement of a system 70, and the post-conversion signal is output to the system 70. Moreover, the system 70 converts the voltage value, which is output by the input-output device 30, into a process value (%).

For example, the system 70 can be implemented as a plant information management system in which the time-series data of process values is managed as historian data.

The current output range used in the loop 3 explained above, that is, the range from 4 mA to 20 mA represents the world standard for the transmission signals for instrumentation. In the initial stages in which automated control first came into use in processes, the signal current values that were transmitted used to be different depending on the manufacturer. Thus, if the input-output device 30 and the two-wire transmitter 50 were manufactured by different manufacturers, then it was difficult to secure compatibility in the transmission and reception of signals. However, since the time when the current values were standardized between 4 mA and 20 mA in IEC381 (latter-day IEC60381-1), it became easier to establish connection between the input-output device 30 and the two-wire transmitter 50, and that has significantly contributed in the development of automated control.

The first advantage of 4-20 mA signals can be said to be the fact that they are current signals. That is, since the signals are not voltage signals, there is no attenuation in the signal amplitude in proportion to the cable length. The second advantage can be said to be the fact that the 4-20 mA signals are direct-current signals. That is, since the signals are not alternate-current signals, the noise can be easily removed using a low-pass filter. That makes the 4-20 mA signals resistant to noise.

Aspect of Problem

The circumstances in the world have undergone significant changes, and it has become important for the business enterprises to contribute to sustainable development goals (SDGs).

Each manufacturer carries out product development with the aim of achieving further reduction in the electrical power. However, achieving reduction in the electrical power of the instrumentation standardization signals (4-20 mA signals) and the power-supply voltage (24) V has remained unattempt. As one of the factors, since the instrumentation standardized signals and the power-source voltage thereof is set as the world standard, no skilled person ever thinks of varying that standard.

For example, with reference to the example illustrated in FIG. 2, since the electrical power (W) of (24 V)×(4-20 mA) gets consumed in the entire loop 3, the power consumption increases in proportion to 24 V and 4-20 mA.

Aspect of Problem Solving Approach

In that regard, in the first embodiment, in the input-output device 30 as well as the two-wire transmitter 50, a low-current mode is provided in which the operations are performed within the current output range having the minimum current value or the maximum current value to be smaller than the current output range from 4 mA to 20 mA corresponding to the instrumentation standardized signals.

In the following explanation, the current output range from 4 mA to 20 mA corresponding to the instrumentation standardized signals is sometimes referred to as a "first current output range", and the mode for operating within the first current output range is sometimes referred to as a "standard mode". Moreover, the current output range corresponding to the low-power mode is sometimes referred to as a "second current output range".

In this way, when a low-current mode is provided, an environment gets built in which the standard mode and the low-current mode are present in the input-output device 30 as well as in the two-wire transmitter 50. In that case, in the input-output device 30 as well as in the two-wire transmitter 50, an environment gets created in which the low-current mode is not necessarily implementable in the input-output device 30 as well as in the two-wire transmitter 50.

That is because sometimes the input-output device 30 and the two-wire transmitter 50 are installed at different timings in a manufacturing plant, or sometimes the input-output device 30 and the two-wire transmitter 50 have the same timing for installation but are manufactured by different manufacturers.

In such an environment, there are times when different modes are set in the input-output device 30 and the two-wire transmitter 50, or there are times when a low-current mode is set regardless of the fact that the low-current mode is not implementable in either the input-output device 30 or the two-wire transmitter 50. In such cases, errors occur in the operations of the input-output device 30 and the two-wire transmitter 50. As a result, the input-output device 30 and the two-wire transmitter 50 cannot perform operations in a normal manner.

In that regard, in the first embodiment, a setting function is implemented by which, depending on whether or not the second current output region is successfully obtained from the input-output device 30 and the two-wire transmitter 50, the current output corresponding to either the standard mode or a low-current mode is set.

For example, when the second current output range is successfully obtained, a current output corresponding to the low-current mode can be set. On the other hand, when the second current output range cannot be successfully obtained, a current output corresponding to the standard mode can be set.

For that reason, at the time of implementing the low-current mode, the input-output device 30 as well as the two-wire transmitter 50 can be operated in a normal manner.

Thus, as a result of implementing the setting function according to the first embodiment, it becomes possible to achieve reduction in the electrical power of the loop.
Configuration of Setting Device 10

Given below is an exemplary functional configuration of the setting device 10 that is equipped with the setting function explained above. In FIG. 1, blocks related to the setting function of the setting device 10 are illustrated in a schematic manner. As illustrated in FIG. 1, the setting device 10 includes a communication unit 11, a voltage adjusting unit 13, a setting unit 15, and an operation control unit 17. In FIG. 1, the function units related only to the setting function are selectively illustrated. Thus, the setting device 10 can also include other function units not illustrated in FIG. 1.

The communication unit 11 is a processing unit that performs digital communication with the input-output device 30 and the two-wire transmitter 50. As an example, such digital communication can be implemented according to a hybrid communication method, such as according to highway addressable remote transducer (HART) communication, in which digital signals are superimposed onto the analog signals transmitted via the loop 3.

Figure 3:
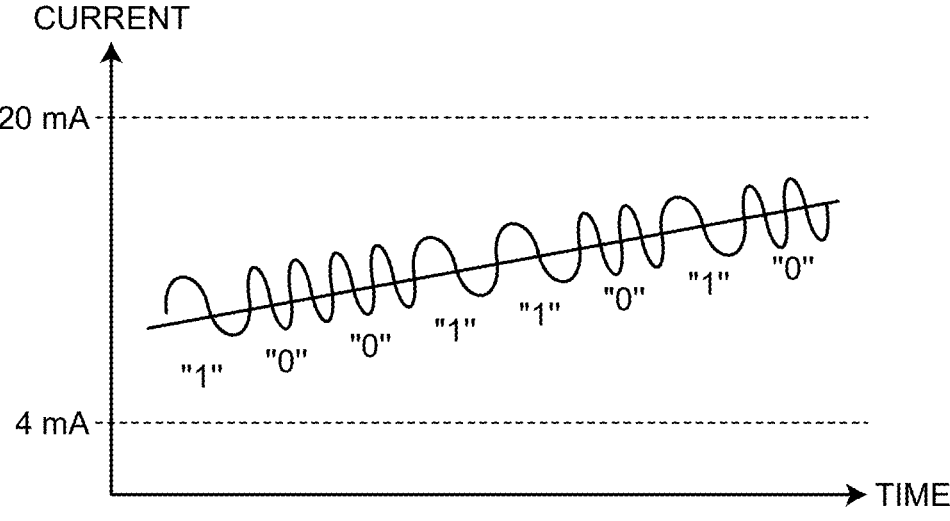
FIG. 3 is a diagram illustrating an example of HART communication.

FIG. 3 is a diagram illustrating an example of HART communication. In FIG. 3 is illustrated an example in which analog signals within the first current output range, that is, analog signals within the range from 4 mA to 20 mA are communicated via the loop 3 between the input-output device 30 and the two-wire transmitter 50. As illustrated in FIG. 3, frequency signals indicating "0" or "1" are superimposed onto the 4-20 mA analog signals. As a result, bidirectional digital communication can be implemented between the input-output device 30 and the two-wire transmitter 50.

As a result of performing such digital communication, the input-output device 30 becomes able to set the status and the parameters of the two-wire transmitter 50, and the two-wire transmitter 50 becomes able to transmit the measured value of a physical quantity to the input-output device 30.

The voltage adjusting unit 13 is a processing unit that adjusts the direct-current voltage which is supplied from the input-output device 30 to the two-wire transmitter 50. In the following explanation, the direct-current voltage that is supplied from the input-output device 30 to the two-wire transmitter 50 is sometimes referred to as the "supply voltage".

Thus, in the first embodiment, in addition to providing a low-current mode explained above, a low-voltage mode is also provided in which the supply voltage from the input-output device 30 is kept variable and in which the operations are performed at a standard voltage value such as a supply voltage value equal to or smaller than the supply voltage value corresponding to 24 V.

From the aspect of implementing the low-voltage mode, the minimum value of the supply voltage at which the operations can be performed is stored in the input-output device 30 as well as in the two-wire transmitter 50. In the following explanation, the minimum value of the supply voltage at which the operations can be performed in the input-output device 30 or the two-wire transmitter 50 is referred to as the "minimum supply-voltage value".

Based on the minimum supply-voltage value stored in the input-output device 30 as well as in the two-wire transmitter 50, the voltage adjusting unit 13 adjusts the supply voltage value at which the input-output device 30 and the two-wire transmitter 50 can perform operations.

More specifically, at the time of booting of the input-output device 30 and the two-wire transmitter 50, the voltage adjusting unit 13 can perform the following operations. The voltage adjusting unit 13 instructs the input-output device 30 to supply the standard voltage value, such as the direct-current voltage value of 24 V, to the two-wire transmitter 50. Herein, supplying the standard voltage of 24 V immediately after the booting has the aspect of holding down the situation in which the two-wire transmitter 50 becomes unable to perform operations before the adjustment of the supply voltage.

If the minimum supply-voltage value is stored in the register of the input-output device 30, the voltage adjusting unit 13 starts the supply of the direct-current voltage corresponding to the minimum supply-voltage value from the input-output device 30 to the two-wire transmitter 50. From the aspect of maximizing the voltage drop of the route, the two-wire transmitter 50 outputs the maximum current value that is a fixed value. Then, the voltage adjusting unit 13 searches for such a supply voltage value at which the input-output device 30 as well as the two-wire transmitter 50 can perform operations and which represents the lower limit of the voltage value.

Examples of a method for searching for the supply voltage value include the linear search method in which the values are sequentially searched from the beginning. However, that is not the only possible case. Alternatively, for example, the binary search method in which the value is searched while narrowing down the range into half can be implemented as the method for searching for the supply voltage value.

For example, until an OK flag indicating that the supply voltage is appropriate is returned from the two-wire transmitter 50 to the input-output device 30, the voltage adjusting unit 13 iteratively performs a supply-voltage adjustment operation in which the supply voltage value is updated by adding a predetermined voltage value to the previous supply voltage value and the direct-current voltage corresponding to the updated supply voltage value is supplied. Meanwhile, if the minimum supply-voltage value is not stored in the register of the input-output device 30, it becomes clear that the input-output device 30 can operate only at the standard supply voltage value. Hence, the adjustment of the supply voltage is not carried out.

At the time of supplying voltage from the input-output device 30 to the two-wire transmitter 50, the voltage adjusting unit 13 determines whether or not the two-wire transmitter 50 can perform operations at the supply voltage coming from the input-output device 30.

That is, when an equivalent resistance is provided midway in the loop 3, the supply voltage coming from the input-output device 30 drops according to the Ohm's law till reaching the two-wire transmitter 50. As an aspect, greater the equivalent resistance value, the greater becomes the drop in the supply voltage. As another aspect, greater the current value, the greater becomes the supply voltage. Herein, the "equivalent resistance" implies the factor that can be treated to be equivalent to the fact that a resistance is present in effect. For example, as the equivalent resistance, it is possible to cite the wiring, the junction resistance, or the contact resistance of a cable. Meanwhile, the equivalent resistance need not mean a resistance element. Thus, the equivalent resistance that is provided in the route from the input-output device 30 to the two-wire transmitter 50 via the loop 3 is sometimes referred to as the "route resistance". From the aspect of searching for the supply voltage value at which the two-wire transmitter 50 can operate while taking into consideration the voltage drop attributed to the route resistance, when the voltage received by the two-wire transmitter 50 satisfies the operable voltage, an OK flag is returned to the input-output device 30.

Figure 4:
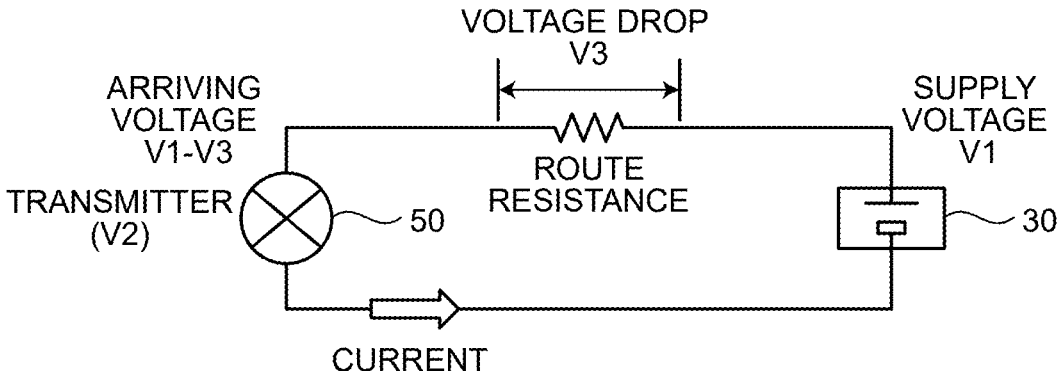
FIG. 4 is a schematic diagram illustrating an example of a route resistance.

FIG. 4 is a schematic diagram illustrating an example of the route resistance. As illustrated in FIG. 4, a supply voltage V1 is supplied from the input-output device 30, and the two-wire transmitter 50 outputs the maximum value of the current. In the supply voltage V1 that is supplied from the input-output device 30, there occurs a voltage drop V3 due to the effect of the route resistance. Because of the effect of the voltage drop V3, the voltage equal to (V1-V3) reaches the two-wire transmitter 50. Then, the voltage adjusting unit 13 compares the voltage value (V1-V3) of the voltage reaching the two-wire transmitter 50 and an operating voltage minimum value V2 that is stored in the register of the two-wire transmitter 50. For example, the voltage adjusting unit 13 determines whether or not the voltage value (V1-V3) of the voltage reaching the two-wire transmitter 50 is equal to or greater than the operating voltage minimum value V2 of the two-wire transmitter 50, that is, determines whether or not (V1-V3)≥V2 holds true.

If (V1-V3)<V2 holds true, then the OK flag cannot be returned because the two-wire transmitter 50 cannot perform operations. In that case, since the OK flag cannot be confirmed, for example, the input-output device 30 increases the supply voltage V1 by adding thereto a voltage value of 1 V or 3 V, and then supplies the direct-current voltage corresponding to the updated supply voltage V1. Once the voltage (V1-V3) reaching the two-wire transmitter 50 becomes equal to or greater than the operating voltage minimum value V2, the two-wire transmitter 50 becomes able to perform operations. As a result, the OK flag is returned from the two-wire transmitter 50 to the input-output device 30.

Thus, the supply voltage V1 for which the OK flag is returned is decided as the adjustment result of the eventual supply voltage.

The setting unit 15 is a processing unit that performs a variety of setting such as the setting of the current output, the supply voltage, and the transmission method. For example, either when the direct-current voltage corresponding to the standard supply voltage value is supplied at the time of booting or after the voltage adjustment is performed by the voltage adjusting unit 13, the setting unit 15 causes the communication unit 11 to perform digital communication for obtaining the second current output range from the input-output device 30 as well as the two-wire transmitter 50.

As an aspect, when digital communication can be performed between the input-output device 30 and the two-wire transmitter 50, that is, when the auto mode is set, the setting unit 15 performs automatic setting of one of four modes, namely, a mode 1 to a mode 4 explained below. That is, depending on whether or not the second current output range is successfully obtained from the input-output device 30 as well as from the two-wire transmitter 50 and depending on whether or not the information about the minimum supply-voltage value is stored in the register of the input-output device 30, the setting unit 15 performs automatic setting of the mode 1 to the mode 4 explained below.

(1) Setting of Mode 1

Figure 5:
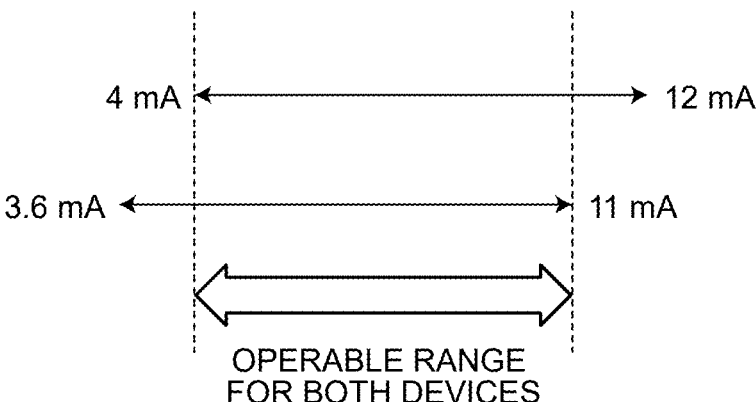
FIG. 5 is a diagram illustrating an example of the current setting of a low-current mode.

For example, when the second current output range is successfully obtained from the input-output device 30 and the two-wire transmitter 50 and when the information about the minimum supply-voltage value is available in the input-output device 30, the setting unit 15 sets the current output and the supply voltage corresponding to the mode 1. For example, as the current output for the mode 1, the setting unit 15 sets the greater of the two minimum current values, namely, the minimum current value of the second current output range as obtained from the input-output device 30 and the minimum current value of the second current output range as obtained from the two-wire transmitter 50. FIG. 5 is a diagram illustrating an example of the current setting of a low-current mode. In FIG. 5, two current output ranges are illustrated, which include a current output range having the minimum value of 4 mA and the maximum value of 12 mA, and a current output range having the minimum value of 3.6 mA and having the maximum value of 11 mA. With reference to the example illustrated in FIG. 5, the current output range within which the input-output device 30 and the two-wire transmitter 50 can perform operations is as following. Regarding the minimum current value, as a result of comparing the minimum current values of the two current output ranges, the greater minimum current value of 4 mA is selected. Regarding the maximum current value, as a result of comparing the maximum current values of the two current output ranges, the smaller maximum current value of 11 mA is selected. Moreover, in the mode 1, since digital communication is possible, the current output is fixed to the minimum current value of 4 mA at which the input-output device 30 and the two-wire transmitter 50 can perform operations. Furthermore, as the supply voltage for the mode 1, the setting unit 15 sets the supply voltage value that is obtained as the adjustment result by the voltage adjusting unit 13, that is, sets the supply voltage value for which the OK flag was returned. Besides, the setting unit 15 sets digital communication, such as HART communication, as the transmission method between the input-output device 30 and the two-wire transmitter 50. The current/voltage setting that includes the current output, the supply voltage, and the transmission method for the mode 1 is registered in the register of the input-output device 30 as well as the two-wire transmitter 50.

> Current output: the minimum current value of the second current output range (greater of the two minimum current values)
> Supply voltage: the post-adjustment supply voltage value
> Transmission method: HART communication (2) Setting of Mode 2

When the second current output range is successfully obtained from the input-output device 30 as well as from the two-wire transmitter 50 but when the information about the minimum supply-voltage value is not available in the input-output device 30, the setting unit 15 sets the current output and the supply voltage corresponding to the mode 2. For example, as the current output for the mode 2, the setting unit 15 sets the greater of the two minimum current values, namely, the minimum current value of the second current output range as obtained from the input-output device 30 and the minimum current value of the second current output range as obtained from the two-wire transmitter 50. Moreover, in the mode 2, since the voltage adjusting unit 13 has not yet performed the electrical power adjustment, the setting unit 15 sets the standard supply voltage value, such as 24 V, as the supply voltage for the mode 2. Besides, the setting unit 15 sets digital communication, such as HART communication, as the transmission method between the input-output device 30 and the two-wire transmitter 50. The current/voltage setting that includes the current output, the supply voltage, and the transmission method for the mode 2 is registered in the register of the input-output device 30 as well as the two-wire transmitter 50.

> Current output: the minimum current value of the second current output range (greater of the two minimum current values)
> Supply voltage: the standard supply voltage value (24 V)
> Transmission method: HART communication (3) Setting of Mode 3

When the second current output range is not successfully obtained from either the input-output device 30 or the two-wire transmitter 50 but when the information about the minimum supply-voltage value is available in the input-output device 30, the setting unit 15 sets the current output and the supply voltage corresponding to the mode 3. For example, as the current output for the mode 3, the setting unit 15 sets the minimum current value of 4 mA that is the minimum current value of the first current output range, that is, the minimum current value of the instrumentation standardized signals. Moreover, as the supply voltage for the mode 3, the setting unit 15 sets the supply voltage value obtained as the adjustment result by the voltage adjusting unit 13, that is, the supply voltage value for which the OK flag was returned. Besides, the setting unit 15 sets digital communication, such as HART communication, as the transmission method between the input-output device 30 and the two-wire transmitter 50. The current/voltage setting that includes the current output, the supply voltage, and the transmission method for the mode 3 is registered in the register of the input-output device 30 as well as the two-wire transmitter 50.

> Current output: 4 mA
> Supply voltage: the post-adjustment supply voltage value
> Transmission method: HART communication (4) Setting of Mode 4

When the second current output range is not successfully obtained from either the input-output device 30 or the two-wire transmitter 50 and when the information about the minimum supply-voltage value is not available in the input-output device 30, the setting unit 15 sets the current output and the supply voltage corresponding to the mode 4. For example, as the current output for the mode 4, the setting unit 15 sets the minimum current value of 4 mA that is the minimum current value of the first current output range, that is, the minimum current value of the instrumentation standardized signals. Moreover, in the mode 4, since the voltage adjusting unit 13 has not yet performed the electrical power adjustment, the setting unit 15 sets the standard supply voltage value, such as 24 V, as the supply voltage for the mode 4. Besides, the setting unit 15 sets digital communication, such as HART communication, as the transmission method between the input-output device 30 and the two-wire transmitter 50. The current/voltage setting that includes the current output, the supply voltage, and the transmission method for the mode 4 is registered in the register of the input-output device 30 as well as the two-wire transmitter 50.

> Current output: 4 mA
> Supply voltage: the standard supply voltage value (24 V)
> Transmission method: HART communication In this way, in the modes from the mode 1 to the mode 4, since the input-output device 30 as well as the two-wire transmitter 50 is equipped with the digital communication function, a fixed current value such as the minimum current value of 4 mA, which is the minimum current value of the second current output range or the minimum current value of the instrumentation standardized signals, is set as the current output. In that case, the measured value is transmitted from the two-wire transmitter 50 to the input-output device 30 according to digital communication. As a result, as compared to the case in which analog communication using current signals is performed, it becomes possible to enhance the power reduction effect.

As another aspect, when digital communication cannot be performed between the input-output device 30 and the two-wire transmitter 50, that is, when the manual mode is set, manual setting is performed for one of the following modes from a mode 5 to a mode 8. That is, based on an operation input about whether or not the second current output range is available in the input-output device 30 as well as in the two-wire transmitter 50 and based on an operation input about whether or not the minimum supply voltage range is available in the register of the input-output device 30, the setting unit 15 performs automatic setting of the modes from the mode 5 to the mode 8. Such an operation input can be received via an operating unit included in the input-output device 30 or the two-wire transmitter 50, or can be received via a correction-enabling device that is connectible to the input-output device 30 or the two-wire transmitter 50.

(5) Setting of Mode 5

For example, when an operation input is received that indicates the availability of the second current output range in the input-output device 30 as well as in the two-wire transmitter 50, and when an operation input is received that indicates the availability of the information about the minimum supply-voltage value in the input-output device 30; the setting unit 15 sets the current output and the supply voltage corresponding to the mode 5. For example, the setting unit 15 receives an operation input indicating that a common range in which the second current output range defined in the input-output device 30 overlaps with the second current output range defined in the two-wire transmitter 50 represents the current output range within which the input-output device 30 as well as the two-wire transmitter 50 can perform operations; and sets the common range, which is received in the operation input, as the current output for the mode 5. For example, with reference to the example illustrated in FIG. 5, the two current output ranges, namely, the current output range from 4 mA to 12 mA and the current output range from 3.6 mA to 11 mA overlap in the range from 4 mA to 11 mA as a result of comparing the minimum current values and comparing the maximum current values. In that case, the common range from 4 mA to 11 mA is set as the current output for the mode 5. Moreover, as the supply voltage for the mode 5, the setting unit 15 sets the supply voltage value obtained as the adjustment result by the voltage adjusting unit 13, that is, the supply voltage value for which the OK flag was returned. Besides, the setting unit 15 sets analog communication using current signals as the transmission method between the input-output device 30 and the two-wire transmitter 50. The current/voltage setting that includes the current output, the supply voltage, and the transmission method for the mode 5 is registered in the register of the input-output device 30 as well as the two-wire transmitter 50.

Current output: the common range between the two of
    second current output ranges
  Supply voltage: the post-adjustment supply voltage value
  Transmission method: analog communication
(6) Setting of Mode 6
  When an operation input is received that indicates the availability of the second current output range in the input-output device 30 as well as in the two-wire transmitter 50, and when an operation input is received that indicates the unavailability of the information about the minimum supply-voltage value in the input-output device 30; the setting unit 15 sets the current output and the supply voltage corresponding to the mode 6. For example, the setting unit 15 receives an operation input indicating that a common range in which the second current output range defined in the input-output device 30 overlaps with the second current output range defined in the two-wire transmitter 50 represents the current output range within which the input-output device 30 as well as the two-wire transmitter 50 can perform operations; and sets the common range, which is received in the operation input, as the current output for the mode 6. Moreover, in the mode 6, since the voltage adjusting unit 13 has not yet performed the electrical power adjustment, the setting unit 15 sets the standard supply voltage value, such as 24 V, as the supply voltage for the mode 6. Besides, the setting unit 15 sets analog communication using current signals as the transmission method between the input-output device 30 and the two-wire transmitter 50. The current/voltage setting that includes the current output, the supply voltage, and the transmission method for the mode 6 is registered in the register of the input-output device 30 as well as the two-wire transmitter 50.

Current output: the common range between the two of
    second current output ranges
  Supply voltage: the standard supply voltage value (24 V)
  Transmission method: analog communication
(7) Setting of Mode 7
  When an operation input is received that indicates the unavailability of the second current output range in either the input-output device 30 or the two-wire transmitter 50, and when an operation input is received that indicates the availability of the information about the minimum supply-voltage value in the input-output device 30; the setting unit 15 sets the current output and the supply voltage corresponding to the mode 7. For example, as the current output for the mode 7, the setting unit 15 sets the first current output range corresponding to the instrumentation standardized signals, that is, sets the current output range from 4 mA to 20 mA. Moreover, as the supply voltage for the mode 7, the setting unit 15 sets the supply voltage value that is obtained as the adjustment result by the voltage adjusting unit 13, that is, sets the supply voltage value for which the OK flag was returned. Besides, the setting unit 15 sets analog communication using current signals as the transmission method between the input-output device 30 and the two-wire transmitter 50. The current/voltage setting that includes the current output, the supply voltage, and the transmission method for the mode 7 is registered in the register of the input-output device 30 as well as the two-wire transmitter 50.

Current output: 4 mA to 20 mA
  Supply voltage: the post-adjustment supply voltage value
  Transmission method: analog communication
(8) Setting of Mode 8
  When an operation input is received that indicates the unavailability of the second current output range in either the input-output device 30 or the two-wire transmitter 50, and when an operation input is received that indicates the unavailability of the information about the minimum supply-voltage value in the input-output device 30; the setting unit 15 sets the current output and the supply voltage corresponding to the mode 8. For example, as the current output for the mode 8, the setting unit 15 sets the first current output range corresponding to the instrumentation standardized signals, that is, sets the current output range from 4 mA to 20 mA. Moreover, in the mode 8, since the voltage adjusting unit 13 has not yet performed the electrical power adjustment, the setting unit 15 sets the standard supply voltage value, such as 24 V, as the supply voltage for the mode 8. Besides, the setting unit 15 sets analog communication using current signals as the transmission method between the input-output device 30 and the two-wire transmitter 50. The current/voltage setting that includes the current output, the supply voltage, and the transmission method for the mode 8 is registered in the register of the input-output device 30 as well as the two-wire transmitter 50.

Figure 7:
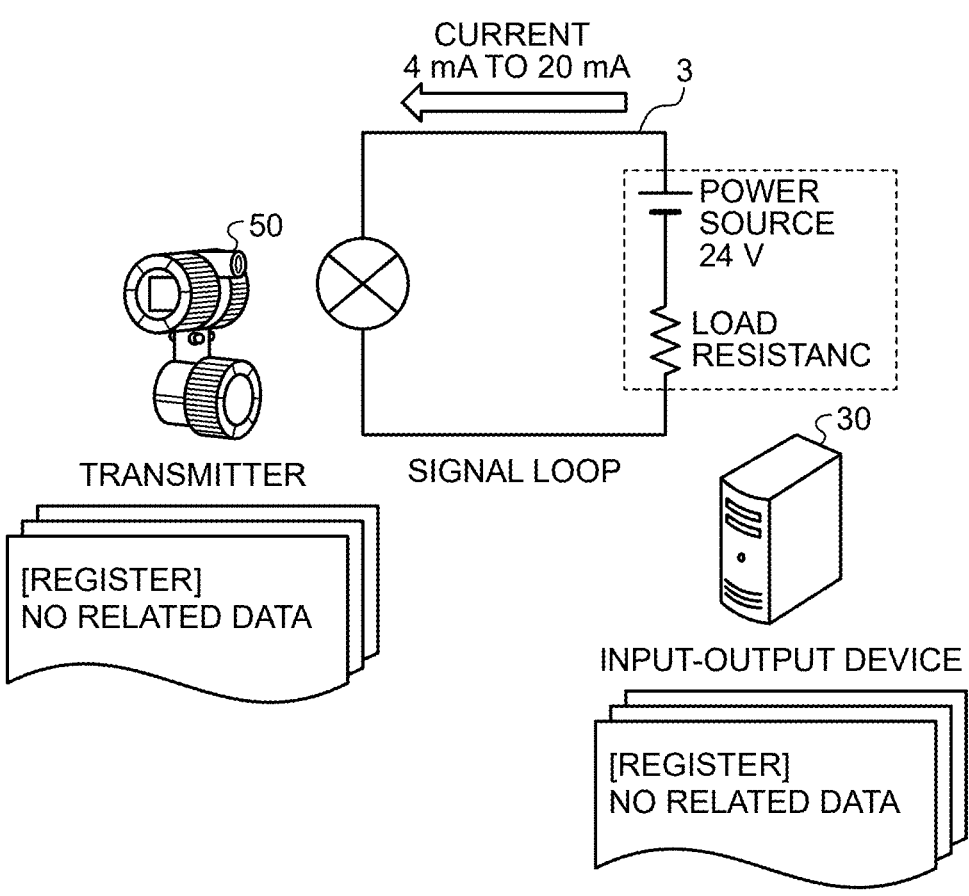
FIG. 7 is a schematic diagram illustrating an example of the operations performed in a mode 8.
Figure 8:
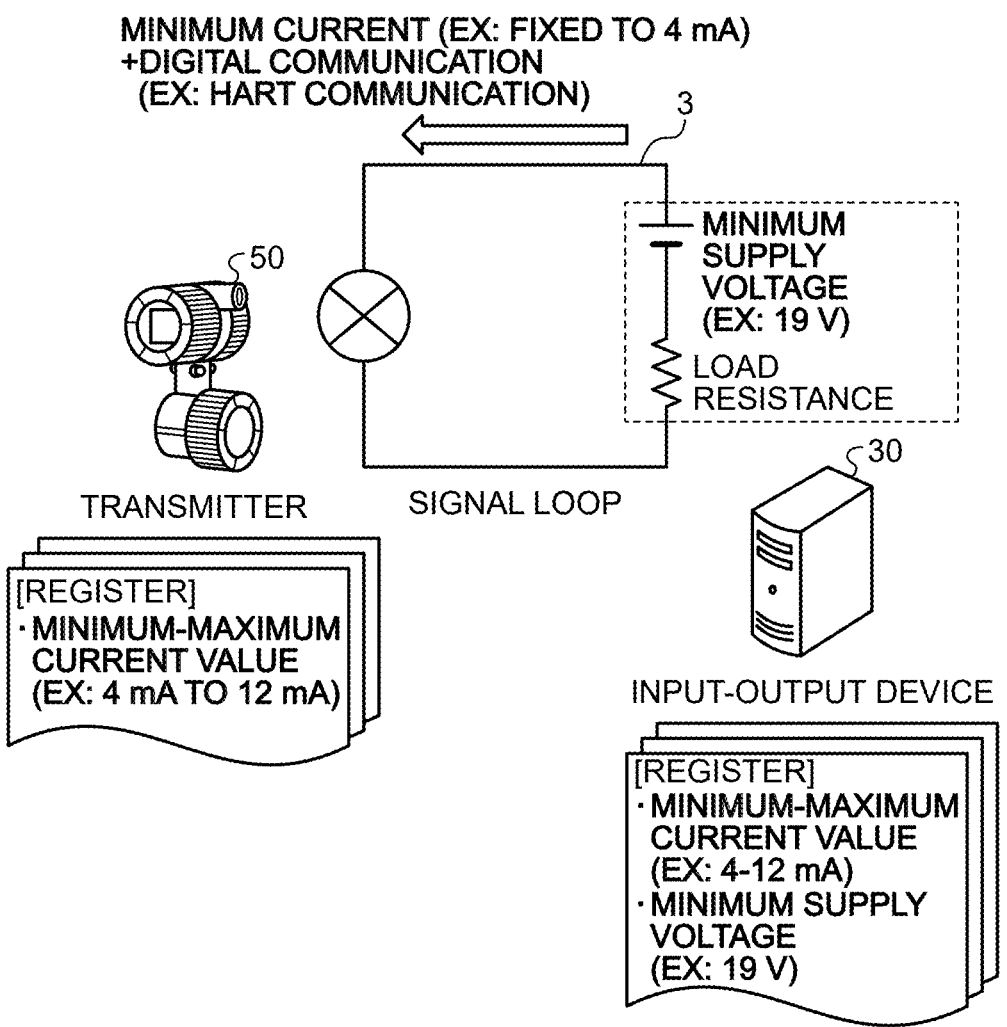
FIG. 8 is a schematic diagram illustrating an example of the operations performed in a mode 1.

Current output: 4 mA to 20 mA
  Supply voltage: the standard supply voltage value (24 V)
  Transmission method: analog communication
  The operation control unit 17 is a function unit that controls the operations of the input-output device 30 or the two-wire transmitter 50. As an aspect, according to the current/voltage setting registered by the setting unit 15, that is, according to the setting of the mode from among the modes from the mode 1 to the mode 8, the operation control unit 17 performs the operations regarding the current output, the supply voltage, and the transmission of the input-output device 30 or the two-wire transmitter 50.
Specific Example of Power Reduction Effect
  Explained below with reference to FIGS. 6 to 8 is a specific example of the power reduction effect achieved in each mode. FIG. 6 is a diagram illustrating the power reduction effect achieved in each mode. FIG. 7 is a schematic diagram illustrating an example of the operations performed in the mode 8. FIG. 8 is a schematic diagram illustrating an example of the operations performed in the mode 1.
  In FIGS. 6 and 8 is illustrated an example in which the second current output range of 4 mA to 12 mA is set for the mode 1, the mode 2, the mode 5, and the mode 6 that correspond to low-current modes. However, the minimum current value can be set to an arbitrary value equal to or smaller than 4 mA, and the maximum current value can be set to an arbitrary value that exceeds the minimum current value and that is smaller than 20 mA. Moreover, in FIGS. 6 and 8 is illustrated an example in which the adjustment result of 19 V is obtained for the supply voltage value in the mode 1, the mode 3, the mode 5, and the mode 7 that correspond to low-voltage modes. However, that is given only as an example, and the supply voltage value is not prevented from being adjusted to a voltage value smaller than 19 V. In FIGS. 6 and 8, for explanatory convenience, the second power output range is standardized to the single type of range from 4 mA to 12 mA. However, as a matter of course, storing a plurality of different second power output ranges, such as the range from 4 mA to 12 MA and the range from 3.6 mA to 12 mA, in the input-output device 30 and the two-wire transmitter 50 cannot be prevented.

From among the modes from the mode 1 to the mode 8; in the mode 8, the range from 4 mA to 20 mA representing the current output range of instrumentation standardized signals is set, and the standard supply voltage value of 24 V is set. In this way, the mode 8 corresponds to the conventional example of operations that neither correspond to a low-current mode nor correspond to a low-voltage mode. In the case of the mode 8, as illustrated in FIG. 7, the direct-current voltage of 24 V is supplied from the input-output device 30 to the two-wire transmitter 50, so that the two-wire transmitter 50 performs operations at the direct-current voltage of 24 V. Moreover, in the case of the mode 8, the two-wire transmitter 50 converts the measured value of a physical quantity, such as the flow rate or the differential pressure, into a current value in the current output range from 4 mA to 20 mA of instrumentation standardized signals; and transmits the current value to the input-output device 30 via the loop 3.

On the other hand, each mode from the mode 1 to the mode 7 either corresponds to a low-current mode or corresponds to a low-voltage mode, and thus corresponds to the example of operations according to the first embodiment. From among the modes from the mode 1 to the mode 7, the following explanation is given about an example of operations performed in the mode 1. With reference to the example of the mode 1 illustrated in FIG. 8, the minimum current value of the second current output range, which is stored in the register of the input-output device 30 as well as the two-wire transmitter 50, is set as the current output. That is, the fixed value of 4 mA is set as the current output. Moreover, in the case of the mode 1 illustrated in FIG. 8, as a result of performing voltage adjustment between the input-output device 30 and the two-wire transmitter 50, the minimum supply-voltage value, that is, the voltage supply value equivalent to 19 V is set as the supply voltage. Thus, the direct-current voltage of 19 V is supplied from the input-output device 30 to the two-wire transmitter 50, and the two-wire transmitter 50 performs operations at the direct-current voltage of 19 V. Moreover, the two-wire transmitter 50 transmits the measured value of a physical quantity, such as the flow rate or the differential pressure, to the input-output device 30 using digital communication.

From the aspect of comparing the conventional example of operations, that is, the example in which the current output is in the range from 4 mA to 20 mA and the supply voltage is equal to 24 V, with the example of operations according to the first embodiment; in FIG. 6 is illustrated an example, in which the maximum consumed power in the mode 8 is set as the reference value, the maximum consumed power in each mode from the mode 1 to the mode 7 is subtracted from the reference value to calculate the corresponding reduced value of the maximum consumed power, and the ratio of the reduced value to the standard value is derived as the power reduction effect.

As illustrated in FIG. 6, from among the modes from the mode 1 to the mode 7, the modes 1 and 3 enable achieving the highest power reduction effect, and it can be expected to achieve the power reduction effect of −84%. The modes 2 and 4 enable achieving the second highest power reduction effect, and it can be expected to achieve the power reduction effect of −80%. From the order of arrangement of the modes, it can be understood that the modes in which the current output is fixed to a single value, that is, either fixed to the minimum current value or fixed to 4 mA and in which the measured value is transmitted using digital communication are the modes enabling achieving higher power reduction effect as compared to the other modes.

Flow of Operations

Figure 9:
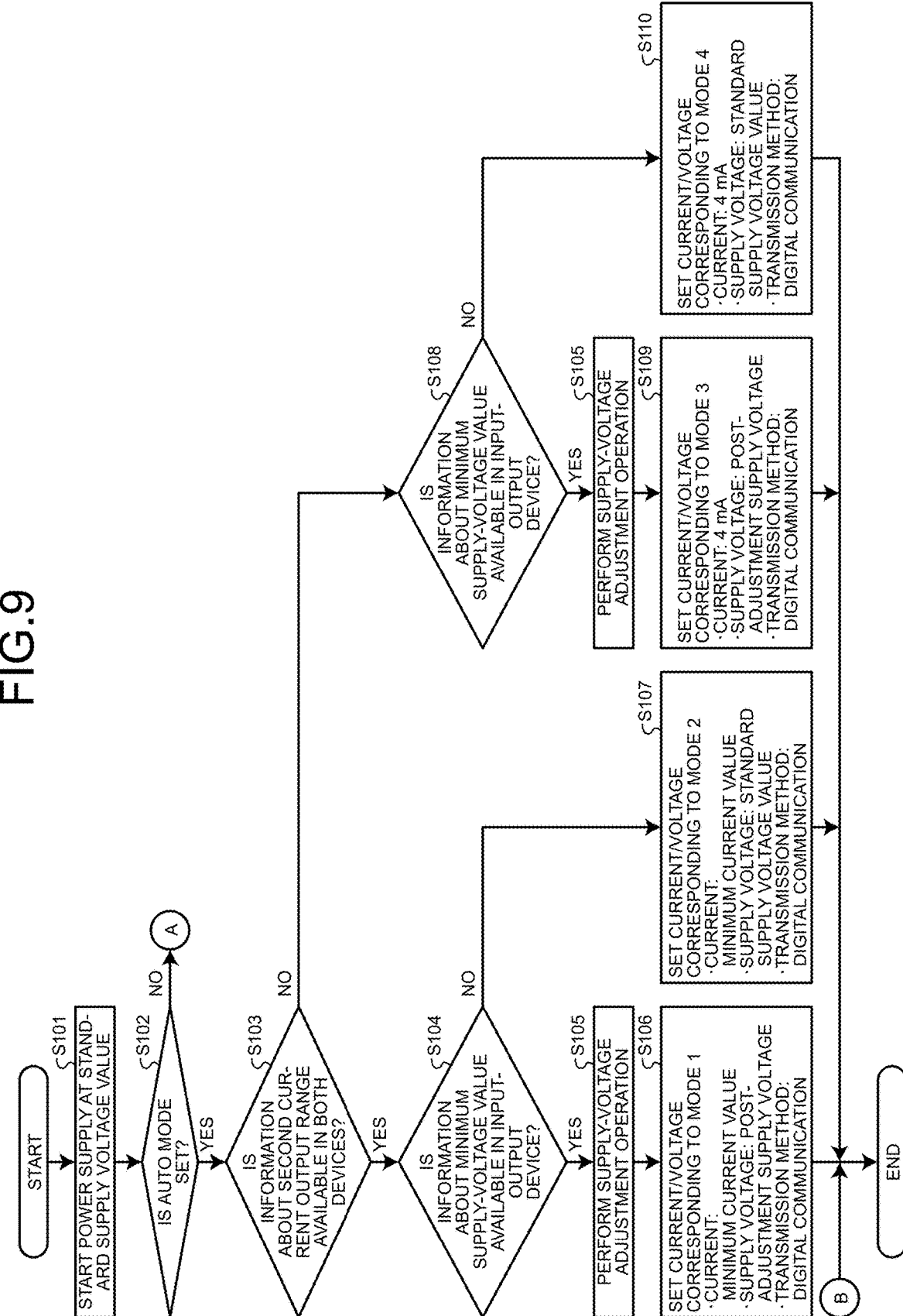
FIG. 9 is a flowchart (1) for explaining the sequence followed in a setting operation.
Figure 10:
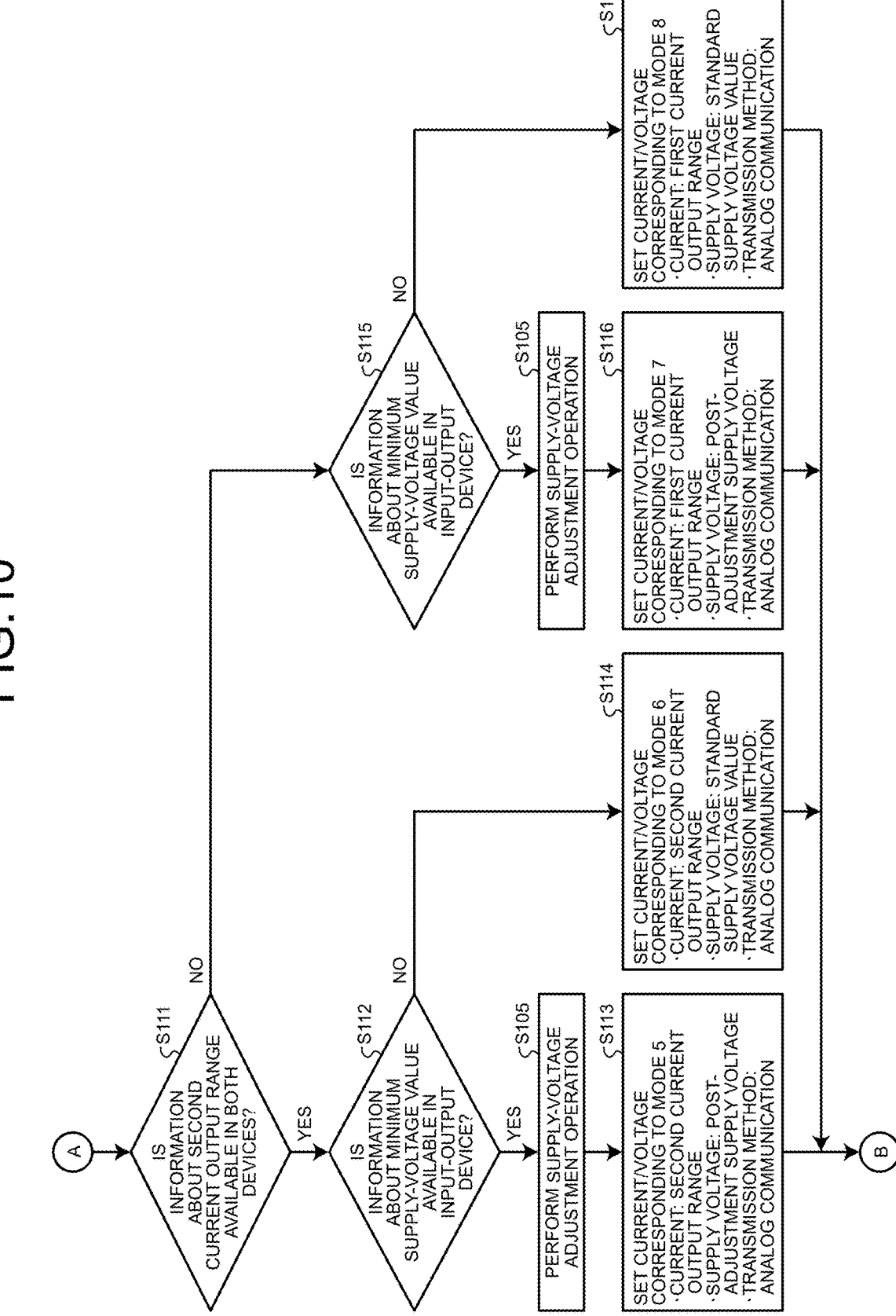
FIG. 10 is a flowchart (2) for explaining the sequence followed in the setting operation.

Given below is the explanation of the flow of operations performed in the setting device 10 according to the first embodiment. FIGS. 9 and 10 are flowcharts for explaining the sequence followed in a setting operation. Only as an example, this operation can be started at the time of booting of the input-output device 30 and the two-wire transmitter 50.

As illustrated in FIG. 9, the voltage adjusting unit 13 supplies the standard voltage value, such as the direct-current voltage of 24 V, from the input-output device 30 to the two-wire transmitter 50 (Step S101).

If digital communication is enabled between the input-output device 30 and the two-wire transmitter 50, that is, if the auto mode is set (Yes at Step S102), the setting unit 15 performs automatic setting of one of four modes from the mode 1 to the mode 4 explained earlier.

That is, when the second current output range is successfully obtained from the input-output device 30 as well as from the two-wire transmitter 50 and when the information about the minimum supply-voltage value is available in the input-output device 30 (Yes at Step S103 and Yes at Step S104), the voltage adjusting unit 13 performs a supply-voltage adjustment operation for adjusting the supply voltage between the input-output device 30 and the two-wire transmitter 50 (Step S105). As a result of performing the supply-voltage adjustment operation, the lower limit of the supply voltage value is retrieved at which the input-output device 30 and the two-wire transmitter 50 can perform operations. Then, the setting unit 15 sets the current output and the supply voltage corresponding to the mode 1 explained earlier (Step S106).

When the second current output range is successfully obtained from the input-output device 30 as well as from the two-wire transmitter 50 but when the information about the minimum supply-voltage value is not available in the input-output device 30 (Yes at Step S103 and No at Step S104), the setting unit 15 sets the current output and the supply voltage corresponding to the mode 2 explained earlier (Step S107).

When the second current output range is not successfully obtained from either the input-output device 30 or the two-wire transmitter 50 but when the information about the minimum supply-voltage value is available in the input-output device 30 (No at Step S103 and Yes at Step S108), the voltage adjusting unit 13 performs the supply-voltage adjustment operation for adjusting the supply voltage between the input-output device 30 and the two-wire transmitter 50 (Step S105). As a result of performing the supply-voltage adjustment operation, the lower limit of the supply voltage value is retrieved at which the input-output device 30 and the two-wire transmitter 50 can perform operations.

Then, the setting unit 15 sets the current output and the supply voltage corresponding to the mode 3 explained earlier (Step S109).

When the second current output range is not successfully obtained from either the input-output device 30 or the two-wire transmitter 50 and when the information about the minimum supply-voltage value is not available in the input-output device 30 (No at Step S103 and No at Step S108), the setting unit 15 sets the current output and the supply voltage corresponding to the mode 4 explained earlier (Step S110).

Meanwhile, when digital communication cannot be performed between the input-output device 30 and the two-wire transmitter 50, that is, when the manual mode is set (No at Step S102), manual setting is performed for one of the modes from the mode 5 to the mode 8 explained earlier.

As illustrated in FIG. 10, when an operation input is received that indicates the availability of the second current output range in the input-output device 30 as well as in the two-wire transmitter 50, and when an operation input is received that indicates the availability of the information about the minimum supply-voltage value in the input-output device 30 (Yes at Step S111 and Yes at Step S112); the voltage adjusting unit 13 performs the supply-voltage adjustment operation for adjusting the supply voltage between the input-output device 30 and the two-wire transmitter 50 (Step S105). As a result of performing the supply-voltage adjustment operation, the lower limit of the supply voltage value is retrieved at which the input-output device 30 and the two-wire transmitter 50 can perform operations. Then, the setting unit 15 sets the current output and the supply voltage corresponding to the mode 5 explained earlier (Step S113).

When an operation input is received that indicates the availability of the second current output range in the input-output device 30 as well as in the two-wire transmitter 50, and when an operation input is received that indicates the unavailability of the information about the minimum supply-voltage value in the input-output device 30 (Yes at Step S111 and No at Step S112); the setting unit 15 sets the current output and the supply voltage corresponding to the mode 6 explained earlier (Step S114).

When an operation input is received that indicates the unavailability of the second current output range in either the input-output device 30 or the two-wire transmitter 50, and when an operation input is received that indicates the availability of the information about the minimum supply-voltage value in the input-output device 30 (No at Step S111 and Yes at Step S115); the voltage adjusting unit 13 performs the supply-voltage adjustment operation for adjusting the supply voltage between the input-output device 30 and the two-wire transmitter 50 (Step S105). As a result of performing the supply-voltage adjustment operation, the lower limit of the supply voltage value is retrieved at which the input-output device 30 and the two-wire transmitter 50 can perform operations. Then, the setting unit 15 sets the current output and the supply voltage corresponding to the mode 7 explained earlier (Step S116).

When an operation input is received that indicates the unavailability of the second current output range in either the input-output device 30 or the two-wire transmitter 50, and when an operation input is received that indicates the unavailability of the information about the minimum supply-voltage value in the input-output device 30 (No at Step S111 and No at Step S115); the setting unit 15 sets the current output and the supply voltage corresponding to the mode 8 explained earlier (Step S117).

Summary of First Embodiment

As explained above, depending on whether or not the second current output range is successfully obtained from the input-output device 30 and the two-wire transmitter 50, the setting device 10 according to the first embodiment sets the current output either corresponding to the standard mode or corresponding to a low-current mode. Thus, at the time of implementing a low-current mode, it can be ensured that the input-output device 30 as well as the two-wire transmitter 50 performs operations in a normal manner. Hence, it becomes possible to implement a low-current mode. Thus, the setting device 10 according to the first embodiment enables achieving reduction in the electrical power of the loop.

Moreover, between the input-output device 30 and the two-wire transmitter 50, the setting device 10 according to the first embodiment performs adjustment to lower the supply voltage from the standard supply voltage value, that is, from 24 V; and set the post-adjustment supply voltage value as the supply voltage. For that reason, it becomes possible to implement a low-voltage mode. Thus, the setting device 10 according to the first embodiment enables achieving reduction in the electrical power of the loop.

Second Embodiment

Given below is the explanation of an exemplary functional configuration in the case in which the setting function explained above in the first embodiment is provided in the input-output device 30 as well as in the two-wire transmitter 50.

Configuration of Input-Output Device 30

Figure 11:
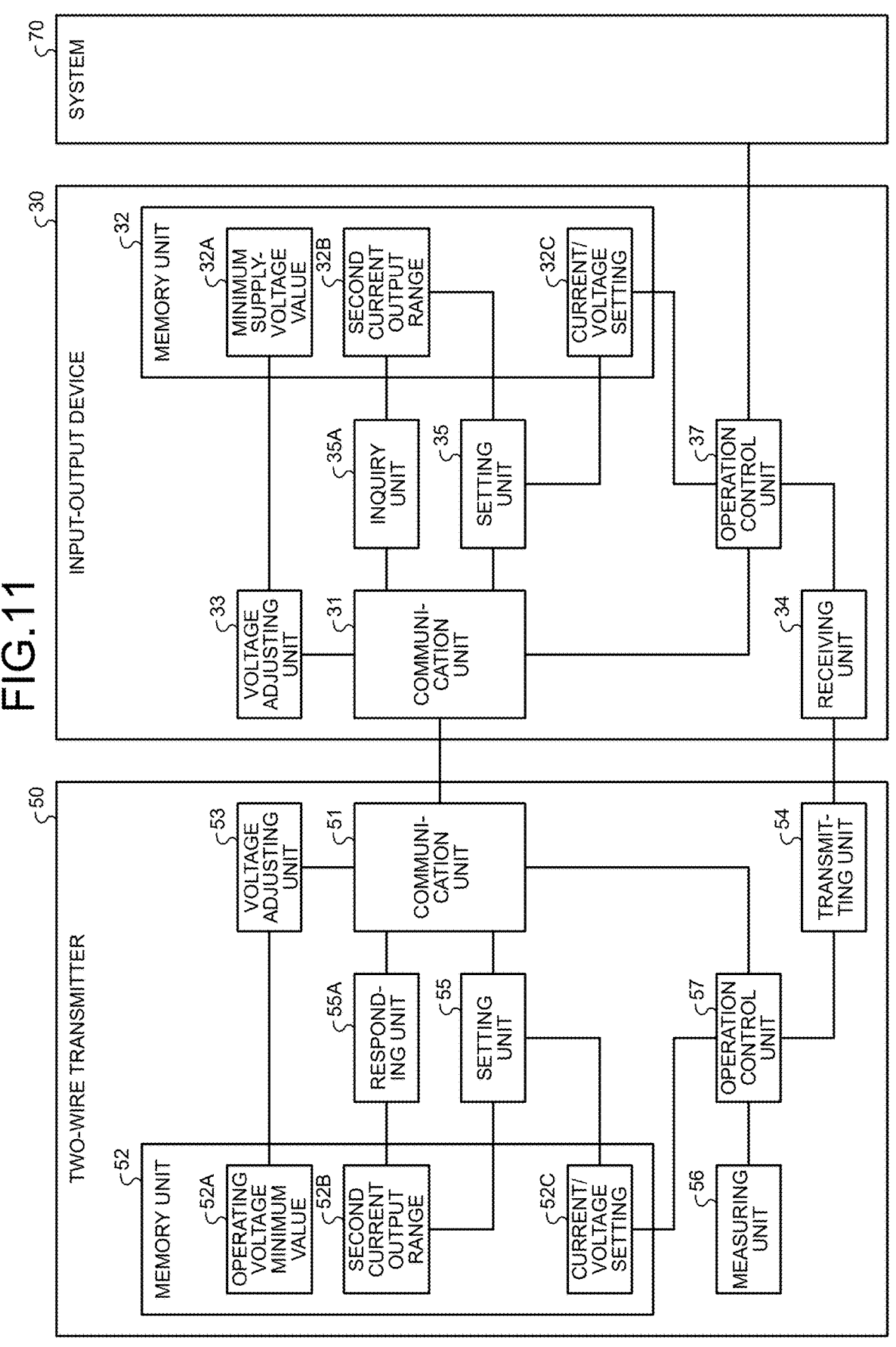
FIG. 11 is a block diagram illustrating an exemplary functional configuration of an input-output device and a transmitter.

FIG. 11 is a block diagram illustrating an exemplary functional configuration of the input-output device 30 and the transmitter 50. In FIG. 11, blocks related to the setting function of the input-output device 30 and blocks related to the setting function of the transmitter 50 are illustrated in a schematic manner. Meanwhile, in FIG. 11, the solid lines joining the blocks are illustrated only to indicate the cause-and-effect relationship and the input-output relationship among the functions. Thus, the solid lines do not necessarily imply the wire connections among the physical constituent elements.

As illustrated in FIG. 11, the input-output device 30 includes a communication unit 31, a memory unit 32, a voltage adjusting unit 33, a receiving unit 34, an inquiry unit 35A, a setting unit 35, and an operation control unit 37.

The communication unit 31 corresponds to the communication unit 11 illustrated in FIG. 1, and performs digital communication with the two-wire transmitter 50. As an example, such digital communication can be implemented according to a hybrid communication method, such as according to HART communication, in which digital signals are superimposed onto the analog signals transmitted via the loop 3.

The memory unit 32 is a processing unit for storing a variety of information. Only as an example, the memory unit 32 can be implemented using a register or a cache. However, the memory unit 32 is not limited to be an internal memory of a processor, and alternatively can be implemented using some other storage device such as a main memory, a nonvolatile memory, or a storage.

The voltage adjusting unit 33 corresponds to the voltage adjusting unit 13 illustrated in FIG. 1 and performs adjustment of the supply voltage from the input-output device 30 to the two-wire transmitter 50. Only as an example, at the time of booting of the input-output device 30, the voltage adjusting unit 33 supplies the standard voltage value, for example, the direct-current voltage of 24 V to the two-wire transmitter 50. When a minimum supply-voltage value 32A is stored in the memory unit 32, the voltage adjusting unit 33 starts supplying the direct-current voltage corresponding to the minimum supply-voltage value 32A. Then, the voltage adjusting unit 33 searches for the lower limit of the supply voltage value at which the input-output device 30 and the two-wire transmitter 50 can perform operations. Only as an example, such adjustment of the supply voltage value can be performed according to the linear search method explained earlier. For example, until an OK flag indicating that the supply voltage is appropriate is returned from the two-wire transmitter 50, the voltage adjusting unit 33 iteratively performs an operation in which the supply voltage value is updated by adding a predetermined voltage value to the previous supply voltage value and a supply voltage confirmation signal is transmitted for confirming whether or not the two-wire transmitter 50 can perform operations when supplied with the direct-current voltage corresponding to the updated supply voltage value. Meanwhile, if the minimum supply-voltage value 32A is not stored in the memory unit 32, it becomes clear that the input-output device 30 can operate only at the standard supply voltage value. Hence, the adjustment of the supply voltage is not carried out.

The receiving unit 34 is a processing unit that receives analog current signals via the loop 3. The received current value is then output to the operation control unit 37.

The inquiry unit 35A is a processing unit that inquires about the second current output range with the two-wire transmitter 50. Only as an example, when the direct-current voltage corresponding to the standard supply voltage value is supplied at the time of booting or after the voltage adjustment is performed by the voltage adjusting unit 33, the inquiry unit 35A starts the operations. That is, the inquiry unit 35A sends, to the two-wire transmitter 50 via the communication unit 31, a current value confirmation signal that includes a request for inquiring about a second current output range 32B stored in the memory unit 32 and for inquiring about a second current output range 52B stored in a memory unit 52 of the two-wire transmitter 50.

The setting unit 35 corresponds to the setting unit 15 illustrated in FIG. 1, and performs a variety of setting such as the setting of the current output, the supply voltage, and the transmission method. Herein, the setting unit 35 obtains the second current output range 32B, which is stored in the memory unit 32, as the second current output range of the input-output device 30. Moreover, the setting unit 35 either obtains the second current output range 52B, which is included in the current value confirmation signal received as the response to the current value confirmation signal sent by the inquiry unit 35A, or obtains no information as the second current output range of the two-wire transmitter 50. Meanwhile, the setting of the current output, the supply voltage, and the transmission method corresponding to one of the modes from the mode 1 to the mode 8 is performed according to the same logic as the logic applied in the setting unit 15 illustrated in FIG. 1. As a result, current/voltage setting 32C of the current output, the supply voltage, and the transmission method gets registered in the memory unit 32.

The operation control unit 37 is a function unit that controls the overall operations of the input-output device 30. Only as an example, according to the current/voltage setting 32C registered by the setting unit 35, that is, according to the mode that is set from among the modes from the mode 1 to the mode 8, the operation control unit 37 performs operations corresponding to the current output, the supply voltage, and the transmission of the input-output device 30.

As an aspect, when the current/voltage setting 32C indicates one of the modes from the mode 1 to the mode 4, the operation control unit 37 receives the measured value of a physical quantity via the digital communication performed by the communication unit 31.

As another aspect, when the current/voltage setting 32C indicates one of the modes from the mode 5 to the mode 8, based on the numerical range between the minimum current value and the maximum current value registered in the current/voltage setting 32C, the operation control unit 37 digitizes the current value received via the receiving unit 34 and transmits the digital value to the system 70. For example, when a low-current mode is set, the operation control unit 37 performs scaling for assigning the minimum current value of the current/voltage setting 32C to the minimum current value of the numerical range of the standard mode, and for assigning the maximum current value of the current/voltage setting 32C to the maximum current value of the numerical range of the standard mode. For example, in a low-current mode in the range from 4 mA to 12 mA, when the current value of 12 mA is received via the receiving unit 34, the operation control unit 37 converts that current value into the current value of 20 mA and outputs the digital signal thereof to the system 70.

As a result of performing such scaling, in the system 70, the current value can be received in the 4-20 mA scale corresponding to the numerical range of the standard mode. For that reason, in the system 70, without performing scaling between a low-current mode and the standard mode, the current value received from the input-output device 30 can be converted into a process value between 0% and 100%. Hence, it becomes possible to eliminate the necessity to change the hardware configuration and the software configuration of the system 70.

Configuration of Two-Wire Transmitter 50

As illustrated in FIG. 11, the two-wire transmitter 50 includes a communication unit 51, a memory unit 52, a voltage adjusting unit 53, a transmitting unit 54, a responding unit 55A, a setting unit 55, a measuring unit 56, and an operation control unit 57.

The communication unit 51 corresponds to the communication unit 11 illustrated in FIG. 1, and performs digital communication with the input-output device 30. As an example, such digital communication can be implemented according to a hybrid communication method, such as according to HART communication, in which digital signals are superimposed onto the analog signals transmitted via the loop 3.

The memory unit 52 is a function unit used to store a variety of information. Only as an example, the memory unit 52 can be implemented using a register or a cache. However, the memory unit 52 is not limited to be an internal memory of a processor, and alternatively can be implemented using some other storage device such as a main memory, a nonvolatile memory, or a storage.

The voltage adjusting unit 53 corresponds to the voltage adjusting unit 13 illustrated in FIG. 1 and performs adjustment of the supply voltage from the input-output device 30 to the two-wire transmitter 50. Only as an example, the voltage adjusting unit 53 starts the operations when the supply of the standard voltage value, such as the direct-current voltage of 24 V, starts from the voltage adjusting unit 33 of the input-output device 30. At that time, from the aspect of maximizing the voltage drop of the route, the voltage adjusting unit 53 outputs the maximum current value that is a fixed value. Then, at the time of the voltage supply from the input-output device 30 to the two-wire transmitter 50, the voltage adjusting unit 53 determines whether or not the voltage value of the voltage reaching the two-wire transmitter 50 is equal to or greater than an operating voltage minimum value 52A stored in the memory unit 52. If the voltage value of the voltage reaching the two-wire transmitter 50 is equal to or greater than the operating voltage minimum value 52A, it is determined that the two-wire transmitter 50 can perform operations. In that case, the voltage adjusting unit 53 returns the OK flag to the input-output device 30.

The transmitting unit 54 is a processing that transmits analog current signals via the loop 3. Only as an example, in response to an instruction issued by the operation control unit 57, the transmitting unit 54 generates a current value corresponding to the instruction at a timing corresponding to the instruction.

The responding unit 55A is a processing unit that responds to the input-output device 30 with the current output range of the two-wire transmitter 50. Only as an example, either when the direct-current voltage corresponding to the standard supply voltage value is supplied at the time of booting or after the voltage adjustment is performed by the voltage adjusting unit 53, the responding unit 55A starts the operations. That is, via the communication unit 51, the responding unit 55A receives a current value confirmation signal that includes the second current output range 32B of the input-output device 30 and includes a request for referring to the second current output range of the two-wire transmitter 50. At that time, if the second current output range 52B is registered in the memory unit 52, the responding unit 55A sends back a current value response signal that includes the second current output range 52B. On the other hand, if the second current output range 52B is not stored in the memory unit 52, the responding unit 55A sends back a current value response signal indicating the unavailability of the information about the second current output range 52B.

The setting unit 55 corresponds to the setting unit 15 illustrated in FIG. 1, and performs a variety of setting such as the setting of the current output, the supply voltage, and the transmission method in the two-wire transmitter 50. Herein, the setting unit 55 obtains the second current output range 52B, which is stored in the memory unit 52, as the second current output range of the two-wire transmitter 50. Moreover, the setting unit 55 either obtains the second current output range 32B, which is included in the current value confirmation signal received by the responding unit 55A, or obtains no information as the second current output range of the input-output device 30. Meanwhile, the setting of the current output, the supply voltage, and the transmission method corresponding to one of the modes from the mode 1 to the mode 8 is performed according to the same logic as the logic applied in the setting unit 15 illustrated in FIG. 1. As a result, current/voltage setting 52C of the current output, the supply voltage, and the transmission method gets registered in the memory unit 52.

The measuring unit 56 is a processing unit that measures a physical quantity such as the differential pressure, the temperature, or the flow rate. The measured value is then output to the operation control unit 57.

The operation control unit 57 is a function unit that controls the overall operations of the two-wire transmitter 50. Only as an example, according to the current/voltage setting 52C registered by the setting unit 55, that is, according to the mode that is set from among the modes from the mode 1 to the mode 8, the operation control unit 57 performs operations corresponding to the current output, the supply voltage, and the transmission of the two-wire transmitter 50.

As an aspect, when the current/voltage setting 52C indicates one of the modes from the mode 1 to the mode 4, the operation control unit 57 sends the measured value of a physical quantity, which is measured by the measuring unit 56, the input-output device 30. As another aspect, when the current/voltage setting 52C indicates one of the modes from the mode 5 to the mode 8, the operation control unit 57 converts the measured value, which is measured by the measuring unit 56, into a current value based on the numerical range from the minimum current value to the maximum current value as registered in the current/voltage setting 52C. Then, the transmitting unit 54 is instructed to transmit the current value obtained by conversion.

Sequence of Operations

Figure 12:
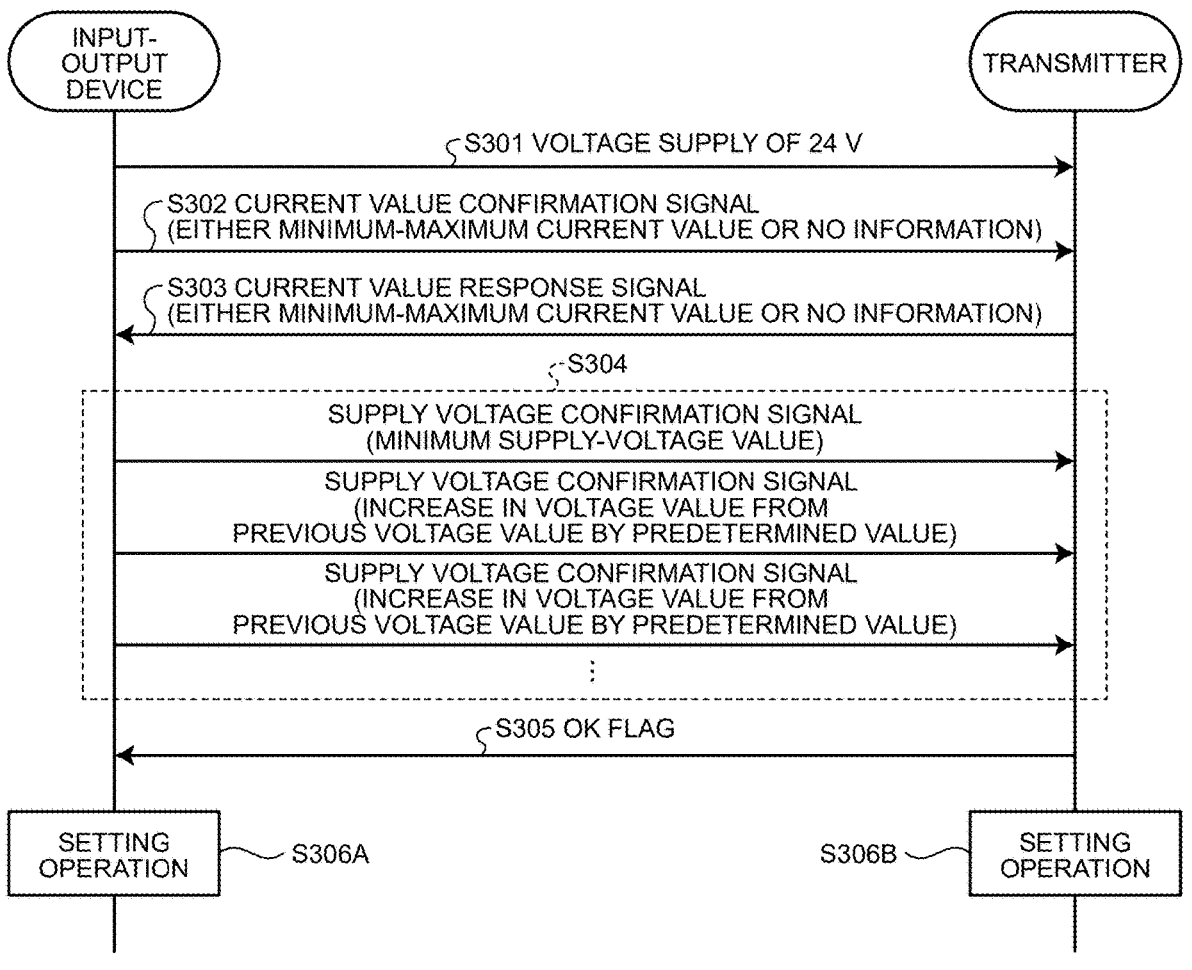
FIG. 12 is a sequence diagram illustrating the operations performed by the input-output device and the two-wire transmitter.

Given below is the explanation of the operations performed by the input-output device 30 and the two-wire transmitter 50. FIG. 12 is a sequence diagram illustrating the operations performed by the input-output device 30 and the two-wire transmitter 50. As illustrated in FIG. 12, at the time of booting, the voltage adjusting unit 33 of the input-output device 30 supplies the standard voltage value such as the direct-current voltage of 24 V to the two-wire transmitter 50 (Step S301). The operation performed at Step S301 corresponds to the operation performed at Step S101.

Then, the inquiry unit 35A of the input-output device 30 sends, to the two-wire transmitter 50 via the communication unit 31, a current value confirmation signal that includes a request for inquiring about the second current output range 32B stored in the memory unit 32 and for inquiring about the second current output range 52B stored in the memory unit 52 of the two-wire transmitter 50 (Step S302).

When the current value confirmation signal is received by the two-wire transmitter 50, the responding unit 55A of the two-wire transmitter 50 sends, to the input-output device 30, a response either indicating the second current output range 52B or indicating no information about the second current output range 52B (Step S303).

The operations performed at Steps S302 and S303 correspond to the operation performed at Step S104 illustrated in FIG. 9.

Then, the voltage adjusting unit 33 of the input-output device 30 performs the operation at Step S304 as follows. At Step S304, the voltage adjusting unit 33 of the input-output device 30 supplies the direct-current voltage corresponding to the minimum supply-voltage value and starts sending the supply voltage confirmation signal meant for confirming whether or not the two-wire transmitter 50 can perform operations. Then, the voltage adjusting unit 33 of the input-output device 30 searches for the lower limit of the supply voltage value at which the input-output device 30 as well as the two-wire transmitter 50 can perform operations. Only as an example, such adjustment of the supply voltage value can be performed according to the linear search method explained earlier. For example, until an OK flag is returned from the two-wire transmitter 50 at Step S305, the voltage adjusting unit 33 iteratively performs an operation in which the supply voltage value is updated by adding a predetermined voltage value to the previous supply voltage value and a supply voltage confirmation signal is transmitted for confirming whether or not the two-wire transmitter 50 can perform operations when supplied with the direct-current voltage corresponding to the updated supply voltage value.

The operations performed at Steps S304 and S305 correspond to the operation performed at Step S105 illustrated in FIG. 9.

When the adjustment of the supply voltage is completed, the setting unit 35 of the input-output device 30 as well as the setting unit 55 of the two-wire transmitter 50 sets the current output, the supply voltage, and the transmission method corresponding to one of the modes from the mode 1 to the mode 8 (Steps S306A and S306B).

The operations performs at Steps S306A and S306B are identical to the operations from Step S104 to Step S117 illustrated in FIGS. 9 and 10. Hence, that explanation is not given again.

With reference to FIG. 12, only as an example, the explanation is given about the case in which the supply-voltage adjustment operation at Step S304 is performed according to the linear search method. However, that is not the only possible case, and implementation of some other method such as the binary search method cannot be prevented.

Summary of Second Embodiment

As explained above, in an identical manner to the first embodiment described earlier, the input-output device 30 and the two-wire transmitter 50 according to the second embodiment enable implementation of a low-current mode and a low-voltage mode. Thus, according to the input-output device 30 and the two-wire transmitter 50 according to the second embodiment, it becomes possible to achieve reduction in the electrical power of the loop.

OTHER EMBODIMENTS

While the embodiments of the present disclosure have been described above, various modifications may be made, and various different modes may be adopted other than the embodiments as described above.

Scope of Application

In the first and second embodiments described above, although the two-wire transmitter 50 is used, the connection method of the transmitter is of course not limited to the two-wire connection. For example, it is also possible to implement a three-wire connection or a four-wire connection.

FIG. 13 is a diagram illustrating an example of the application range of a low-current mode and a low-voltage mode. As illustrated in FIG. 13, the three-wire connection differs from the two-wire connection only in the way that a GND line is connected to the transmitter 50 as well as the input-output device 30. However, the consumed power of the entire loop 3 is identical to the consumed power in the two-wire connection. For that reason, in the three-wire connection too, a low-current mode and a low-voltage mode can be applied, and an identical power reduction effect to the power reduction effect in the two-wire connection (see FIG. 6) can be achieved.

In the four-wire connection, in an identical manner to the two-wire connection, signal output lines 3 of the current value is shared between the input-output device 30 and the transmitter 50. Hence, in the four-wire connection too, a low-current mode can be applied. On the other hand, in the four-wire connection, the voltage supply of 24 V to the transmitter 50 is performed from an external power source 40. Hence, power source lines 5 are formed between the external power source 40 and the transmitter 50. For each transmitter 50 that is connected to the external power source 40, if voltage adjustment of the external power source 40 can be performed; then a low-voltage mode of the manual type (the mode 5 or the mode 7) can be applied. Moreover, greater the range within which voltage adjustment of the external power source 40 can be performed, that is, greater the range to which the voltage supply of 24 V can be lowered, the greater is the extent to which the supply voltage value can be lowered in a low-voltage mode. Meanwhile, when digital communication can be performed between the external power source 40 and the transmitter 50, a low-voltage mode of the auto type (the mode 1 or the mode 3) can also be applied.

Numerical Values

In the explanation of the embodiments, for example, the specific examples of the number of two-wire transmitters 50 or the types of target physical quantity for measurement are only exemplary, and can be modified to other values. Moreover, also regarding the flowcharts explained in the embodiments, a different sequence of operations can be followed as long as there are no contradictions.

System

The processing procedures, the control procedures, specific names, various data, and information including parameters described in the embodiments or illustrated in the drawings can be changed as required unless otherwise specified. For example, one or more function units from among the communication unit 11, the voltage adjusting unit 13, the setting unit 15, and the operation control unit 17 can be configured in separate devices.

The constituent elements of the device illustrated in the drawings are merely conceptual, and need not be physically configured as illustrated. The constituent elements, as a whole or in part, can be separated or integrated either functionally or physically based on various types of loads or use conditions. Moreover, each configuration can also be a physical configuration.

The process functions implemented in the device are entirely or partially implemented by a central processing unit (CPU) or by computer programs that are analyzed and executed by a CPU, or are implemented as hardware by wired logic.

Hardware

Figure 14:
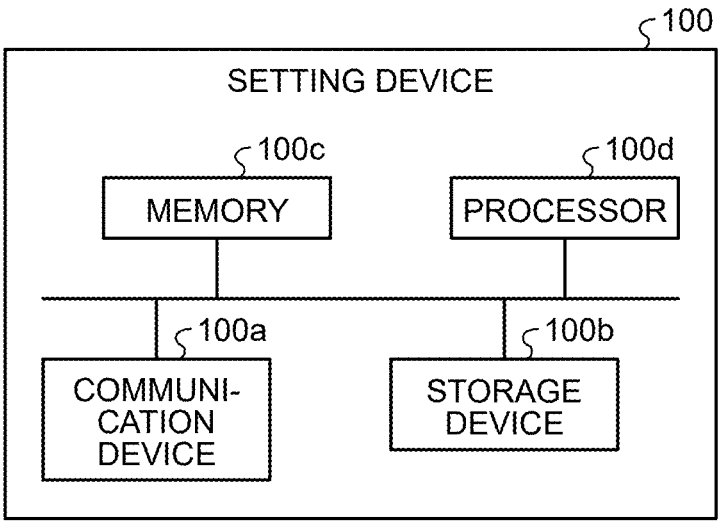
FIG. 14 is a diagram illustrating an exemplary hardware configuration.

Given below is the explanation of an exemplary hardware configuration of a computer explained in the embodiments. FIG. 14 is a diagram illustrating an exemplary hardware configuration. As illustrated in FIG. 14, a setting device 100 includes a communication device 100a, a storage device 100b, a memory 100c, and a processor 100d. The constituent elements illustrated in FIG. 14 are connected to each other by a bus.

The communication device 100a is a HART modem that superimposes digital signals onto the analog signals communicated via the loop 3. The storage device 100b is a read only memory (ROM) or a hard disk drive (HDD), and is used to store the computer program meant for implementing the functions illustrated in FIG. 1 and to store the data referred to by the computer program.

The processor 100d reads the computer program, which is meant to execute identical operations to the operations performed by the processing units illustrated in FIG. 1, from the storage device 100b and loads it in the memory 100c; and runs a process for implementing the functions explained with reference to FIGS. 9 and 10. For example, the process executes functions identical to the processing units of the setting device 10 illustrated in FIG. 1. More particularly, the processor 100d reads, from the storage device 100b, a computer program written to have identical functions to the communication unit 11, the voltage adjusting unit 13, the setting unit 15, and the operation control unit 17. Then, the processor 100*d* executes a process that performs operations identical to the communication unit 11, the voltage adjusting unit 13, the setting unit 15, and the operation control unit 17.

In this way, the setting device 100 operates as a setting device that reads and executes a computer program and implements the setting method. Alternatively, using a medium reading device, the setting device 100 can read the computer program from a recording medium and execute that computer program to implement identical functions to the functions explained in the embodiments. Meanwhile, the computer program mentioned in this section of "other embodiments" is not limited to be executed by the setting device 100. For example, even when some other computer or some other server executes the computer program or when such devices execute the computer program in cooperation, the present invention can still be applied in an identical manner.

The computer program can be distributed via a network such as the Internet. Alternatively, the computer program can be recorded in an arbitrary recording medium, and a computer can read the computer program from the recording medium and execute it. For example, the recording medium can be implemented using a hard disk, a flexible disk (FD), a CD-ROM, a magneto-optical (MO) disk, or a digital versatile disc (DVD).

Miscellaneous

Given below is the explanation of some combinations of the technical features disclosed herein.

According to an embodiment, it becomes possible to achieve reduction in the electrical power of a loop.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A setting device comprising:
a processor configured to:
perform communication for obtaining a second current output range which represents a current output range of a transmission signal passing via a loop formed between a transmitter that converts a physical quantity into a current value and an input-output device that outputs a current value input from the transmitter to a system and which has a minimum current value smaller than a minimum current value of a first current output range or a maximum current value smaller than a maximum current value of the first current output range; and
set current output corresponding to either the first current output range or the second current output range based on whether or not the second current output range is successfully obtained.

2. The setting device according to claim 1, wherein the processor is further configured to set, as current output of the transmission signal, greater of minimum current values from among minimum current value of a second current output range as obtained from the input-output device and minimum current value of a second current output range as obtained from the transmitter when the second current output range is successfully obtained.

3. The setting device according to claim 1, wherein the processor is further configured to set minimum current value of the first current output range as current output of the transmission signal when the second current output range is not successfully obtained.

4. The setting device according to claim 1, wherein the processor is further configured to:
receive, when the communication is not successful and when the second current output range is not successfully obtained, an operation input of a common range in which a second current output range defined in the input-output device and a second current output range defined in the transmitter overlap with each other; and
set the common range, which is received in the operation input, as current output of the transmission signal.

5. The setting device according to claim 4, wherein the processor is further configured to convert current value of the transmission signal into a process value based on minimum current value and maximum current value of a second current output range set.

6. The setting device according to claim 1, wherein the processor is further configured to:
perform adjustment for lowering supply voltage, which is supplied from the input-output device to the transmitter via the loop, to lower limit value which is equal to or smaller than standard supply voltage value and at which the input-output device and the transmitter are able to perform operations; and
set, as the supply voltage, lower limit value of supply voltage adjusted at the adjustment.

7. The setting device according to claim 6, wherein the processor is further configured to implement linear search or binary search and searches for lower limit value at which the input-output device and the transmitter are able to perform operations.

8. The setting device according to claim 1, wherein the first current output range is from 4 mA to 20 mA.

9. The setting device according to claim 1, wherein the communication is performed according to highway addressable remote transducer (HART) communication.

10. A setting method that causes a computer to execute a processor comprising:
performing communication with a transmitter for obtaining a second current output range which represents a current output range of a transmission signal passing via a loop formed between a transmitter that converts a physical quantity into a current value and an input-output device that outputs a current value input from the transmitter to a system and which has a minimum current value smaller than a minimum current value of a first current output range or a maximum current value smaller than a maximum current value of the first current output range; and
setting current output corresponding to either the first current output range or the second current output range based on whether or not the second current output range is successfully obtained.

11. A non-transitory computer readable recording medium storing therein a setting program that causes a computer to execute a process comprising:
performing communication with a transmitter for obtaining a second current output range which represents a current output range of a transmission signal passing via a loop formed between a transmitter that converts a physical quantity into a current value and an input-output device that outputs a current value input from the transmitter to a system and which has a minimum current value smaller than a minimum current value of a first current output range or a maximum current value smaller than a maximum current value of the first current output range; and setting current output corresponding to either the first current output range or the second current output range based on whether or not the second current output range is successfully obtained.

\* \* \* \* \*